April 18, 1950      F. J. STOLLSTEIMER      2,504,900
ROTARY FOOD SHREDDER AND GRATER Filed May 9, 1947      2 Sheets-Sheet 2

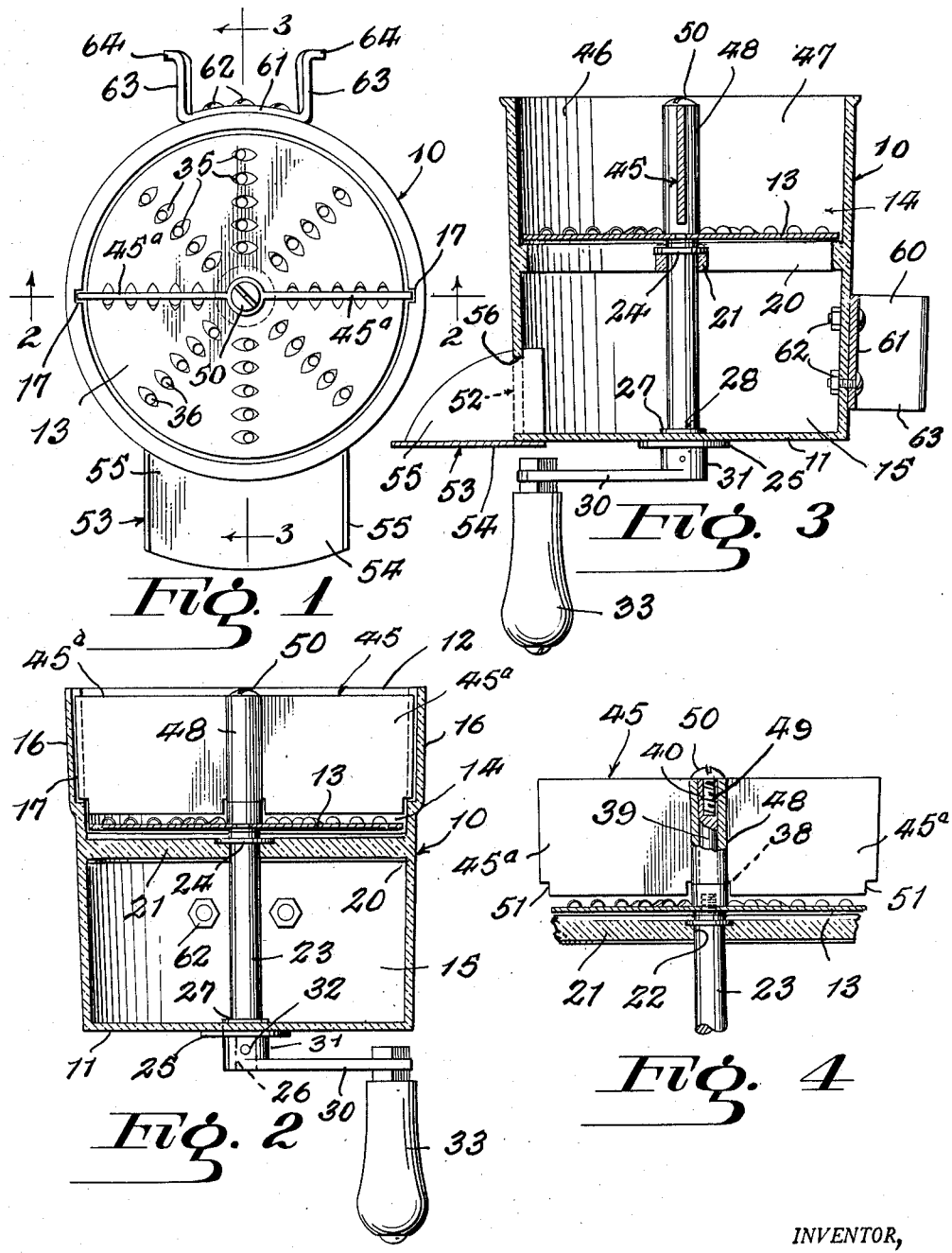

INVENTOR,
Frederick J. Stollsteimer
BY
Christian R. Nielsen
ATTORNEY

Patented Apr. 18, 1950

2,504,900

UNITED STATES PATENT OFFICE 2,504,900

ROTARY FOOD SHREDDER AND GRATER

Frederick J. Stollsteimer, Miami, Fla.

Application May 9, 1947, Serial No. 747,099

3 Claims. (Cl. 146—177)

This invention relates to an improved kitchen utensil for shredding or grating foods. An object of the invention is the provision of shredder and grater which is divided into several compartments for receiving the food to be acted on so that when the cutting device is operated the different kinds of food will be sheared off and deposited in separate piles in a receiving compartment.

Another object of the invention is the provision of a device for shearing off particles or strips of one or more vegetables which are adapted to be employed in salads or which may be cooked, the construction being such that the particles of the vegetables when two or more are used or acted on will be deposited in individual piles so that said piles may be removed separately from a receiving chamber and be mixed together in the proper proportions as desired, a partition being provided in a shearing chamber for maintaining the vegetables out of contact with each other during the shearing operation.

A further object of the invention is the provision of a device for shearing off particles from two or more vegetables simultaneously in such manner that danger of abrasions to the hands of the operator is eliminated while reducing the labor in the preparation of certain kinds of food, said device including a rotary shredder or grater dividing a housing into a shearing compartment and a receiving compartment, a partition dividing the shearing compartment into two or more sections or chambers to contain the foods to be acted on, the receiving compartment being beneath the shredder or grater so that the sheared vegetable particles will fall into individual piles and may be removed separately, the shredder or grater being operated by a shaft which is alined with the vertical axis of the housing and which is rotated by a crank below the housing, a presser being applied to the food in the shearing compartment.

The invention consists in the novel construction, arrangement and combinations of parts hereinafter more particularly described and claimed.

In the drawings:

Figure 1 is a plan view of a grater or shredder constructed in accordance with the principles of my invention.

Figure 2 is a transverse vertical section taken along the line 2—2 of Figure 1.

Figure 3 is a transverse vertical section taken along the line 3—3 of Figure 1.

Figure 4 is a fragmentary transverse vertical section showing the grater and associated parts removed from the housing.

Figure 5:
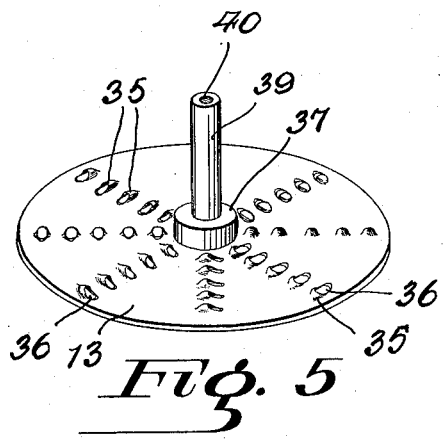
Figure 5 is a view in perspective of a grater removed from the operating mechanism.

Referring more particularly to Figures 1 to 5 inclusive, 10 designates a cylindrical housing which may be made of metal or of plastic materials. Said housing has a circular bottom 11 and an open top 12 and is divided by a grater disk 13 into an upper shearing compartment 14 and a lower receiving compartment 15. The upper compartment has a slightly greater diameter than the lower compartment due to the fact that the walls of the upper compartment are flared. The upper wall is provided at diametrically opposite points with thickened portions 16 to reinforce the wall where vertical slots 17 are formed for a purpose which will be described presently.

A flange 20 is formed on the inner wall of the receiving compartment 15 just below the grater disk 13, affording a bearing support for the disk when heavy pressure is exerted on food placed on the disk. A diametrically disposed bar 21 is integrally formed with the flange and has a central opening 22 which receives the upper end of a shaft 23 which provides a partial bearing for said shaft. A metal collar 24 completing the bearing for the upper end of the shaft 23 is embedded in a pocket in the bar 21 and is secured to the bar in any approved manner.

A centrally disposed boss 25 formed on the bottom 11 of the lower compartment 15 has an opening alining with an opening in the bottom to receive a reduced portion 26 at the lower end of the shaft 23. A collar 27 mounted on the reduced end of the shaft rests on the upper surface of the bottom 11 of the housing and not only retains the shaft in the housing when the grater 13 is removed but provides a bearing for the reduced end of the shaft. A shoulder 28 formed by the reduction of the lower end of the shaft supports the shaft on the collar 27.

A crank 30 has an integrally formed collar 31 pinned at 32 to the reduced end of the shaft 23 which projects below the bottom 11 of the housing. A handle 33 is adapted to actuate the crank and revolve the shaft.

The grater 13 is in the form of a disk and is stamped from a sheet of metal to provide raised cutters 35 (Fig. 5), with corresponding openings 36 through which the pieces of food pass after they have been chipped off the mass of food placed in the shearing compartment 14. A hollow boss 37 is formed centrally on the disk 13 and is internally threaded to receive the reduced threaded upper end 38 of the shaft 23 (Figure 4). A post 39 rises axially from the boss 37 and terminates slightly below a horizontal plane passing through the upper open end of the housing 10 and is provided at its upper free end with an internally threaded pocket 40.

A partition 45 which divides the upper compartment 14 into two chambers 46 and 47 has a centrally disposed sleeve 48 received by the post 39. A screw 49 threaded into the pocket has a head 50 bearing on the upper end of the sleeve 48 for retaining said sleeve on the post. The free ends of the partition are received by the diametrically disposed slots 17 at the inner face of the wall of the upper compartment for retaining said partition against rotation. The partition is provided with notches 51 at its opposite ends so that the lower edge will fall below the lower ends of the slots 17 and will be in close association with the grater 13.

A substantially rectangular opening 52 is formed in the wall of the lower compartment 15 with the lower edge of said opening flush with the inner surface of the bottom 11 of the housing so that the lower compartment may be cleaned thoroughly. A spout 53 has a bottom portion 54 and side walls 55. The inner end of the walls project through the opening 52 into the compartment 15 while the inner end of the bottom 54 extends below the bottom 11 of the housing. The upper inner end of each side wall 55 is provided with a notch 56 adapted to receive the side wall of the housing at the upper edge of the opening 52 in the compartment 15. By this construction the spout may be removed or replaced readily when desired.

A U-shaped clip 60 has its bridging portion 61 secured by bolts 62 to the outer wall of the compartment 11. The flanges 63 of the clip have outturned ears 64 which are adapted to be received by complementary guides formed on a well-known type of wall bracket (not shown). The flanges 63 are inclined toward each other for retaining the clip in the bracket.

Figure 6:
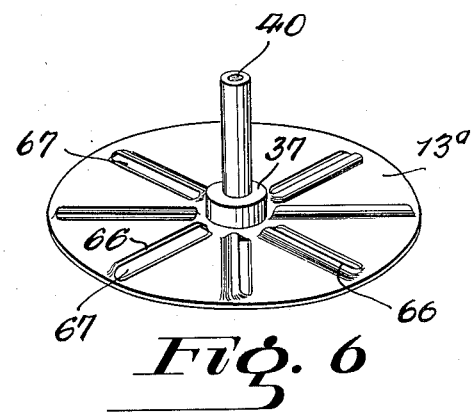
Figure 6 is a view in perspective of a shredder which may replace the grater shown in Figure 5.

In Figure 6 is shown a shredder which is substantially identical in construction except for the shearing elements. In this case the disk 13—a is punched to provide elongated raised cutting blades 67. Since the other elements are identical to similar elements shown in Figure 5, the same reference numerals will be applied.

Either the grater 13 or the shredder 13—a may be employed and the one may be substituted for the other. As previously indicated, the grater and shredder are interchangeable and when this is desired, it is only necessary to apply pressure upon the screw 50 which has left hand threads and then rotate the handle 33 in a reverse direction which will cause an unthreading between the end 38 and the shaft 23. The grater or shredder together with the partition may then be removed from the housing 10. With the parts thus removed the housing may be readily cleaned, and then by removing the screw 50 the partition may be removed and disposed upon and secured to the post 39 of the desired shredder or grater.

Figure 7:
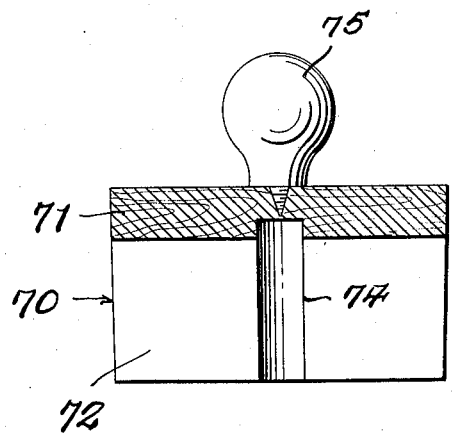
Figure 7 is a vertical section of a presser taken along the line 7—7 of Figure 8.
Figure 8:
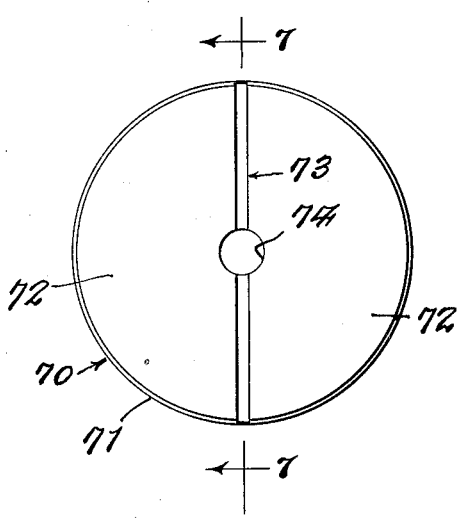
Figure 8 is a bottom plan view of the presser shown in Figure 7.

A plunger or presser 70 (Figures 7 and 8) is employed for maintaining the food in contact with the grater 13 or the shredder 13—a. The presser consists of a circular disk 71 from which depend a pair of semi-cylindrical blocks 72 whose inner flat faces are spaced from each other to provide a passage 73 to receive the partition 45. Each block has a semi-circular groove to form a central passage 74 to receive the sleeve 48 on the central portion of the partition. A handle 75 is secured to the top of the disk for operating the presser.

If one kind of food is to be grated, such as carrots, said food is placed in both chambers 46 and 47 and the crank is operated while the plunger 70 is pressed upon the food. On the other hand, if two kinds of food are to be grated, one such food is placed in the chamber 46, while the other food is deposited in the chamber 47. Thus it will be seen that carrots may be placed in one chamber while cabbage may be selected for the other chamber. In this type of operation, the grated carrots will fall into the compartment 15 and will form a pile, and the cabbage will fall into a separate pile from the chamber above. The grated products are removed through the spout 53.

In a like manner, the member 13—a is employed for shredding lettuce, cabbage or various foods. The shredder 13—a may be readily substituted for the grater as has been explained, supra and vice versa.

The plunger maintains the food in operative engagement with the cutters on the grater 13 or the shredder 13—a. Said plunger is limited in its downward movement when the under face of the disk 71 of said plunger reaches the upper edge of the partition 45, so that the bottom face of the plunger will not come into contact with the grater or shredder.

The partition 45 includes the centrally disposed sleeve 48 which is loosely mounted on the post 39 and a plurality of wings 45—a radiating from the sleeve in a vertical plane. It will be appreciated that while two wings are shown, a greater number of wings may be employed for dividing the upper compartment into three or more chambers. This will be particularly effective when the housing of the utensil has a large diameter and is employed in the kitchens of restaurants and hotels.

I claim:

1. A wall supported kitchen utensil for grating or shredding foods comprising a housing having a cylindrical interior, a disk provided with cutters thereon and dividing the housing into horizontally disposed upper and lower compartments, a vertical shaft mounted axially in bearings in the lower compartment, means for rotating the shaft, cooperating means on the shaft and disk removably connecting said disk to the shaft, a post rising axially from the disk, a sleeve loosely mounted on the post, wings radiating from the sleeve and dividing the upper compartment into a plurality of chambers to receive different foods, means on the post retaining the sleeve thereon, and means on the wall of the upper compartment and engageable with the wings for preventing rotation of said wings, the lower compartment being provided with a lateral discharge opening.

2. A kitchen utensil for grating or shredding foods comprising a housing having a cylindrical interior, a disk provided with cutters thereon and dividing the housing into horizontally disposed upper and lower compartment, a vertical shaft mounted axially in bearings in the lower compartment, means for rotating the shaft, cooperating means on the shaft and disk removably connecting said disk to the shaft, a boss fixed centrally to the upper face of the disk, a post rising from the boss, a sleeve received by the post and resting on the boss, wings radiating from the sleeve and dividing the upper compartment into a plurality of chambers to receive different foods, means on the post retaining the sleeve thereon, and means on the wall of the upper compartment and engageable with the wings for preventing rotation of said wings, the lower compartment being provided with a discharge opening.

3. A kitchen utensil for grating or shredding foods comprising a vertically disposed housing having a cylindrical interior and having an upper open end, a horizontal flange on the inner wall of the housing midway between the upper and lower ends of said housing, a diametrically disposed bar having its ends connected to the flange, a bearing mounted centrally in the bar, a bearing in vertical alignment with the first bearing and incorporated in the bottom of the housing, a shaft projected through said bearings, a handle connected to said shaft below the bottom of said housing, the upper end of said shaft being rotatably retained in said first bearing and being formed with screw threads, a cutting disc having a central threaded boss for engagement with the threads of the shaft, a post rising from the boss, a sleeve on said post, wings radiating from the sleeve and dividing the housing above the cutting disc into a plurality of chambers, means between the housing and the wings preventing rotation when said cutting disc is rotated, and said post having means for retaining the sleeve upon the boss.

FREDERICK J. STOLLSTEIMER.

REFERENCES CITED

The following references are of record in the file of this patent:

UNITED STATES PATENTS

| Number | Name | Date |
| --- | --- | --- |
| 1,157,013 | Lewis | Oct. 19, 1915 |
| 1,284,314 | Gora | Nov. 12, 1918 |
| 1,371,865 | Coy | Mar. 15, 1921 |
| 1,418,178 | Stelmach | May 30, 1922 |
| 1,768,076 | Klensch, Jr., et al. | June 24, 1930 |
| 1,957,346 | Larson | May 1, 1934 |
| 2,138,716 | Truitt | Nov. 29, 1938 |

FOREIGN PATENTS

| Number | Country | Date |
| --- | --- | --- |
| 60,469 | Germany | July 29, 1912 |